J. E. Emerson,
Saw Teeth.
N° 57,627.   Patented Aug. 28, 1866.
2 Sheets, Sheet 1.
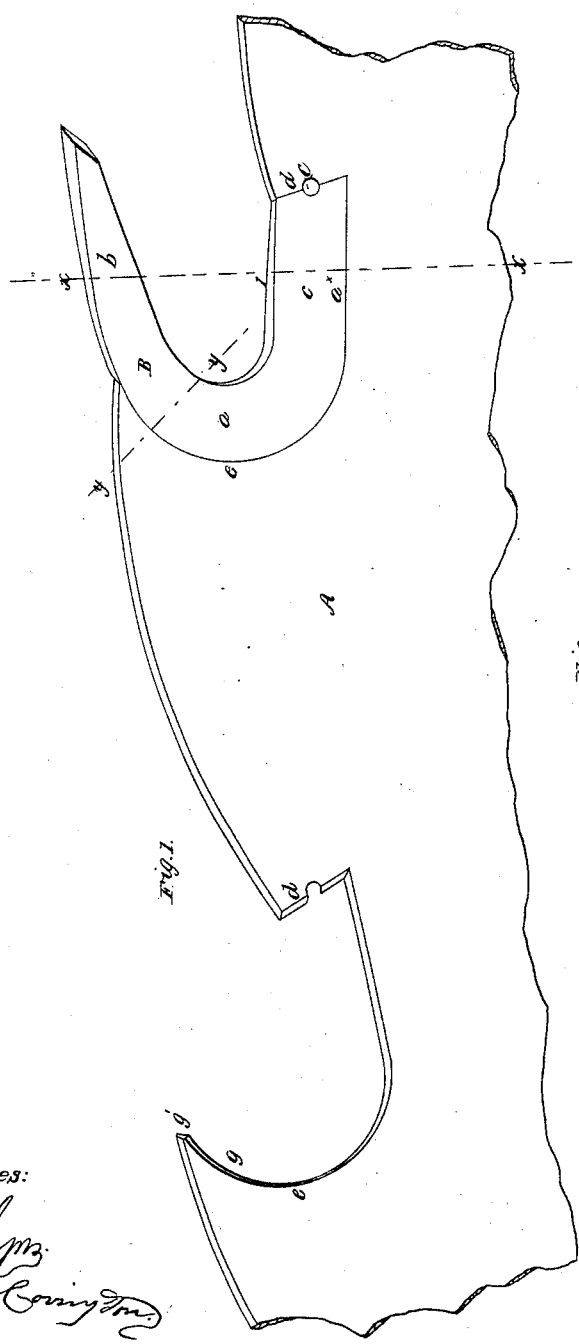
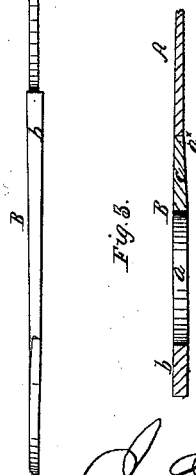
Witnesses:
Inventor:

J. E. Emerson,
Saw Teeth.
N° 57,627.          Patented Aug. 28, 1866.
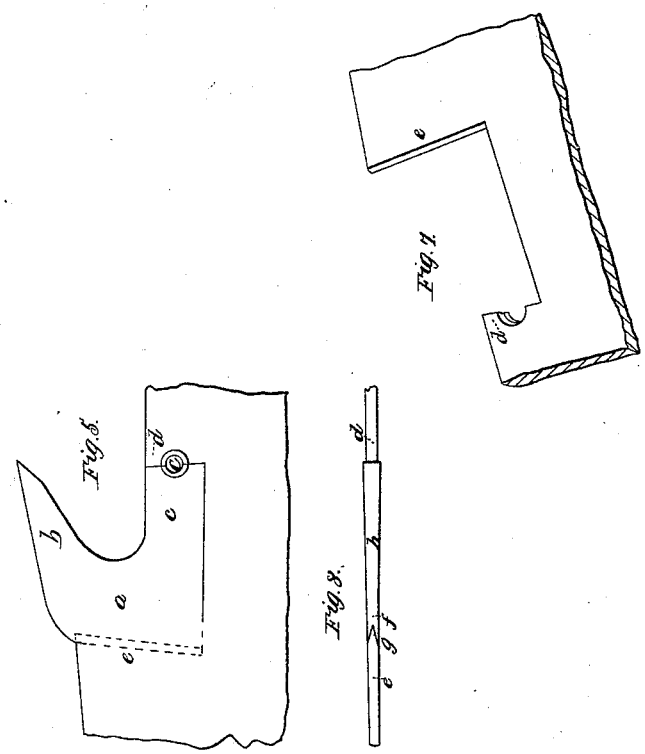
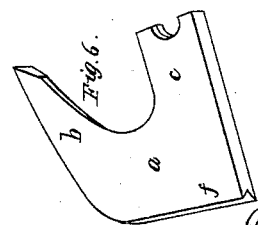
Witnesses:
Inventor:
J. E. Emerson
By Munn & Co.
Atty.

UNITED STATES PATENT OFFICE.

J. E. EMERSON, OF TRENTON, NEW JERSEY, ASSIGNOR TO AMERICAN SAW COMPANY, OF NEW YORK CITY.

IMPROVEMENT IN SAWS.

Specification forming part of Letters Patent No. 57,627, dated August 28, 1866.

*To all whom it may concern:*

Be it known that I, J. E. EMERSON, of Trenton, in the county of Mercer and State of New Jersey, have invented a new and useful Improvement in Circular and other Saws; and I do hereby declare that the following is a full, clear, and exact description thereof, which will enable others skilled in the art to which my invention appertains to make and use the same, reference being had to the accompanying drawings, which are made a part of this specification, and in which—

Figure 1 is a perspective view of my invention. Fig. 2 is an edge view of the same. Fig. 3 is a section of the same, taken in the line $x$ $x$, Fig. 1. Fig. 4 is a section of the same, taken in the line $y$ $y$, Fig. 1. Figs. 5 to 8, inclusive, represent my invention applied to a saw-tooth with straight instead of curved back, Fig. 5 being a side view of the tooth in position in the saw-plate, Fig. 6 a perspective view of the tooth detached, Fig. 7 a perspective view of a fragment of the saw-plate without the tooth, and Fig. 8 an edge view of the parts represented in Fig. 5.

Similar letters of reference indicate corresponding parts in the several figures.

This invention relates to an improvement in circular and other saws of that class which are provided with removable or detachable teeth, and is an improvement on a saw of the class specified, for which Letters Patent were granted to me, bearing date September 12, 1865.

The object of the present invention is to facilitate the adjustment of the teeth in the saw, prevent their escape radially, tangentially, or in any other direction in the plane of the saw without the necessity of applying a rivet or screw at the curved part of the teeth, and at the same time retain all of the advantages of the previous patented invention while avoiding disadvantage pertaining thereto, the same consisting of the weakening of the teeth by the inserting of rivets at the most vulnerable points thereof.

A represents a portion of a circular saw, and B B two teeth thereof. These teeth are of a peculiar shape, their central portion, $a$, being of semicircular or other elbow form, so as to have a bend, their outer parts, $b$, having a tangential position relatively with $a$ and a raking position relatively with the edge of the saw-plate, and having oblique or beveled inner and outer edges, which give the parts $b$ a taper form. The inner parts, $c$, have parallel outer and inner edges.

The back $a$ and heel $c$ of the cutters are fitted within the saw-plate A, recesses being made in the latter to receive said parts, and of such form that the end of the heel $c$ of the teeth will abut against straight shoulders $d$, and the outer edge of the back $a$ against shoulders $e$, as shown clearly in Fig. 1, a projection, $g$, of the saw-plate extending so far over the back of the tooth as to prevent its escape or removal radially, tangentially, or in any other direction in the plane of the saw-plate. In Fig. 5 is clearly shown the convergence of the parts $d$ and $e$, which effectually secures a straight-backed tooth against removal in a radial or tangential direction.

The outer edges of the backs $a$ of the teeth are grooved in V form, as shown at $f$, to receive a corresponding V-shaped projection, $g$, in the shoulders $e$, (see Figs. 4 and 8;) but the edges $a$ of the heels $c$ of the teeth which abut against the saw-plate have plane surfaces.

By this arrangement it will be seen that the teeth may be shoved laterally into the recesses in the saw-plate, and with the greatest facility, the shoulders $a$ being introduced first and the heels $c$ afterward, without a curved movement in the plane of the saw-plate, as in the former plan patented by me, and previously alluded to.

The groove $f$ in the outer edge of the back $a$ of the teeth, with the projection $g$ of the shoulder $e$ fitting in them, effectually holds the backs of the teeth in position, while the parts $c$, being inserted last, are retained in place by rivets C.

I would remark that the shoulders $d$, against which the ends of the heels $c$ of the teeth abut, as well as the ends of $c$, may be beveled so as to prevent the parts $c$ from moving or shifting laterally in one direction.

The rivets C, it will be seen, pass through holes, one half of which are made in the ends of $c$ and the other half in shoulders $d$. By this arrangement the teeth may not only be adjusted in the saw with greater facility than hitherto, but also secured more firmly in position, as the backs $a$ of the teeth may be fitted in deeper recesses, owing to the lateral insertion of the teeth in the saw-plate, and the use of rivets at the semicircular parts of the teeth is avoided, which is an important feature, as the rivet-holes in the original plan served to weaken the teeth, being at a point where the teeth are subjected to the greatest strain.

The teeth B, at their outer edges all around, are thicker than the saw-plate, in order to make a kerf sufficiently wide to keep the saw-plate free from its sides. (See Figs. 2 and 3.) The edges 1 of the parts $c$ of the teeth are not quite so thick as the points of the teeth, said edges 1 being a trifle narrower, so as not to bind in the kerf, but sufficiently wide to clear the kerf of sawdust.

Thus by this simple modification the teeth may be more readily adjusted to and detached from the saw-plate, be more firmly secured in position when adjusted to the saw, friction in the saw-plate in the kerf avoided, the clearing of sawdust from the kerf accomplished, and the teeth not weakened or diminished in strength by rivets, as was hitherto the case.

The application of the rivets at the ends of the parts $c$ of the teeth has a tendency to keep the teeth firmly in position, as they bind the parts $a$ of the teeth firmly against the shoulders $e$ of the saw-plate, whereas in my former plan the rivets at the curve had an opposite tendency.

It will also appear that by the construction now described the teeth are held independently of the rivet or screw against any strain in the plane of the saw.

A great advantage of my manner of inserting the teeth laterally is that it is rendered impossible for them to fly out by centrifugal action even if the rivets should be out. Under my former patent, on the contrary, the teeth were inserted radially in the plane of the saw, so that, although while the teeth were in the wood the action of sawing would tend to keep the teeth in their places, the centrifugal action tended to eject the teeth which were not in the wood, and in case of the breaking or removal of a rivet the tooth was liable to fly out and endanger the injury of an attendant.

Having thus described my invention, I claim as new and desire to secure by Letters Patent—

The teeth B, fitted at the back by tongue-and-groove joints $f\,g$ to the shoulders $e$ of the saw-plate, in combination with rivets, screws, or keys C, applied to the heels $c$ of the teeth, when the parts are constructed and arranged substantially as herein represented, so that in inserting the teeth the shoulders $a$ must be first placed in position and the heels afterward introduced laterally to the saw-plate, and there secured by the rivets C, as explained.

J. E. EMERSON.

Witnesses:
OCTAVIUS KNIGHT,
JOHN A. WIEDERSHEIM.